United States Patent Office

3,671,186
Patented June 20, 1972

3,671,186
METHOD FOR PREPARING ZIRCONIUM TETRA-
CHLORIDE AND HAFNIUM TETRACHLORIDE
Hiroshi Ishizuka, 19–2 Ebara 6-chome, Shinagawa-ku,
Tokyo, Japan
Filed Jan. 6, 1970, Ser. No. 934
Claims priority, application Japan, Jan. 11, 1969,
44/2,179
Int. Cl. C22b 59/00
U.S. Cl. 23—24 Z          6 Claims

ABSTRACT OF THE DISCLOSURE

A method for preparing zirconium tetrachloride having a low hafnium content and high purity hafnium tetrachloride from raw material zirconium tetrachloride containing hafnium tetrachloride in a relatively large amount, by forming a double salt between a salt and the raw material zirconium tetrachloride present in a larger amount than that required for formation of the double salt with the salt, decomposing the resulting double salt allowing vapors resulting from the decomposition, to react with the salts again to form a double salt, and repeating the decomposition, formation and decomposition of the double salt in a multi-stage manner to separate the hafnium content, to obtain zirconium tetrachloride having a low hafnium content, and at the same time concentrating the resulting hafnium tetrachloride contained in the raw material to obtain high purity hafnium tetrachloride.

---

This invention relates to separation and concentration of hafnium content from raw material zirconium tetrachloride containing hafnium, and more particularly to a method for preparing zirconium tetrachloride having a low hafnium tetrachloride content and hafnium tetrachloride having a low zirconium tetrachloride content by separating and concentrating hafnium tetrachloride from raw material zirconium tetrachloride containing hafnium tetrachloride.

For obtaining zirconium which has been recently widely used as a cladding tube for nuclear fuel of a neutron nuclear reactor, it is necessary to repress a hafnium content, which has such a harmful action as to prevent passage of thermal neutrons, to 0.01% by weight or less.

Both zirconium and hafnium belong to Group IV, Subgroup A, and have very similar chemical properties. Further, zirconium ore usually contains 1 to several percents by weight of hafnium.

Heretofore, a solvent extraction method, a fractional crystallization method, a fractional precipitation method, a fractional distillation method, a fractional sublimation method, etc. have been proposed as the conventional processes for separating zirconium and hafnium from each other. Further, as a hafnium concentration process useful for preparing a nuclear reactor control material, for example, a control rod, a method based on treating zirconium tetrachloride vapour with an alkali metal chloride has been proposed, but its process steps are so complicated that a method for separating zirconium and hafnium from each other simply and economically has not been developed yet.

Furthermore, a method based on the reaction of zirconium tetrachloride with an alkali chloride to form a fused double salt and successive ditillation of the salt, or a method based on distillation of a double salt of zirconium tetrachloride with tin dichloride has been proposed. However, satisfactory separation and concentration cannot be carried out by these conventional, ordinary distillation methods. In other words, an accumulative effect by the distillation cannot be attained, and consequently, zirconium and hafnium suitable for nuclear reactors can not be prepared. This is because, even though separation and concentration are carried out when zirconium tetrachloride is allowed to react with an alkali chloride or tin dichloride, the partial pressure of zirconium tetrachloride in the double salt is far lower than the partial pressure of the chloride in the equilibrium state.

It is an object of the present invention to provide a method for separating and concentrating hafnium tetrachloride from zirconium tetrachloride by utilizing such facts that the rate of formation of a double salt of zirconium tetrachloride with an alkali chloride or tin dichloride is different from the rate of formation of a double salt of hafnium tetrachloride with an alkali chloride or tin dichloride, and rates of decomposition of these double salts are different from each other.

That is to say, in the present invention, separation and concentration of hafnium content can be effected by utilizing such phenomena that, when such an alkali chloride as lithium chloride, sodium chloride, potassium chloride, etc., or tin dichloride, or a mixture of at least two of these compounds is allowed to react with zirconium tetrachloride (containing hafnium) in an excess amount over that required for forming a double salt of said compound at a temperature ranging from 350° to 600° C. under a pressure ranging from 1 to 20 atmospheres to form a double salt, the concentration of hafnium remaining in the gaseous phase is always higher than the concentration of hafnium in the liquid phase and the ratio of the hafnium concentration in the liquid phase to that in the gaseous phase is 1:1.5–2.5, though it depends upon the temperature and pressure conditions, and further that, when the resulting double salt is decomposed by heating it to a temperature of 400° to 800° C., preferably 450° to 800° C. under a pressure of 1 to 10 atmospheres, zirconium tetrachloride vapour and hafnium tetrachloride vapour are generated, but in that case the concentration of hafnium contained in the gaseous phase is also always higher than that in the liquid phase, and the ratio of the hafnium concentration in the liquid phase to that in the gaseous phase is 1:1.1–1.7, though it depends upon the temperature and pressure conditions.

In order to completely decompose said partially decomposed double salt, said reaction must be carried out repeatedly, but even in the case that the decomposition is effected not completely, that is, even in the case that the salt is decomposed to the lower double salt, quite a similar reaction takes place as in the case when the reaction is carried out with an alkali chloride, etc. That is, when zirconium tetrachloride vapour in an excess amount is allowed to react with a decomposed lower double salt at a temperature ranging from 350° to 600° C., preferably 350° to 500° C., under a pressure ranging from 1 to 20 atmospheres the concentration of hafnium in the gaseous phase is 1.5 to 2.5 times as high as the concentration of hafnium in the liquid phase.

According to the present invention, separation and concentration of hafnium tetrachloride from zirconium tetrachloride are carried out by repeating said reactions, particularly the reaction of forming the double salt and the reaction of decomposing the double salt.

As salts capable of forming a double salt used in the present invention, such alkali chlorides as lithium chloride, sodium chloride or, potassium chloride, or tin dichloride or a salt mixture of at least two of these salts or a eutectic salt mixture prepared by adding a chloride of an alkaline earth metal to said salt to lower the melting point of the salt, can usually be used, but any other salts can be used, so long as the salts are capable of forming a liquid double salt with zirconium tetrachloride.

The composition of the thus formed double salt depends upon the temperature and pressure conditions, but the higher the zirconium tetrachloride content and hafnium tetrachloride content, the more advantageous the separation and concentration. As regards the composition of the decomposed double salt, the lower the zirconium tetrachloride content, the more advantageous the separation and concentration. The use of a double salt with tin dichloride is particularly advantageous, because the double salt can be completely decomposed.

The portion of an apparatus used for formation of the double salt can be of various structures usually used in fractional distillation, for example, a bubble cap type, perforated plate type, packed type, wet wall type, tubular type, etc., but must be designed, quite different from the ordinary fractional distillation apparatus, so that it may take a long reaction time and has a large contact surface area.

The portion of an apparatus used for decomposition of the double salt must have sufficient heating surface to decompose the introduced double salt. These apparatuses must sufficiently withstand the service temperature and pressure of these apparatuses. Further, as the double salt is somewhat corrosive, it is necessary to keep the temperature as low as possible.

As a material for the apparatuses, stainless steel, glass or an iron material lined with glass is used, but if a little corrosion is permissible, ordinary steel can also be used.

The ratio of separating hafnium tetrachloride from zirconium tetrachloride containing it by formation and decomposition of the double salt is 0.9 to 0.7 per one stage of formation and decomposition, and the ratio of concentrating hafnium tetrachloride is 1.1 to 1.5 by one stage of formation and decomposition. Thus, in order to lower the hafnium content to a grade applicable to nuclear reactors (0.01% by weight or less), 10 to 40 stages of formation and decomposition are required. Further, to make the hafnium concentration of 98.5% by weight or more, 10 to 40 stages of formation and decomposition are likewise necessary.

The case where sodium chloride is used as the chloride is now explained in detail, referring to the accompanying drawings but the same things will be likewise applied to the cases where other chlorides are used. Thus, the object of the present invention and the advantages to be attained according to the present invention will be appreciated from the followings.

Figure 1:
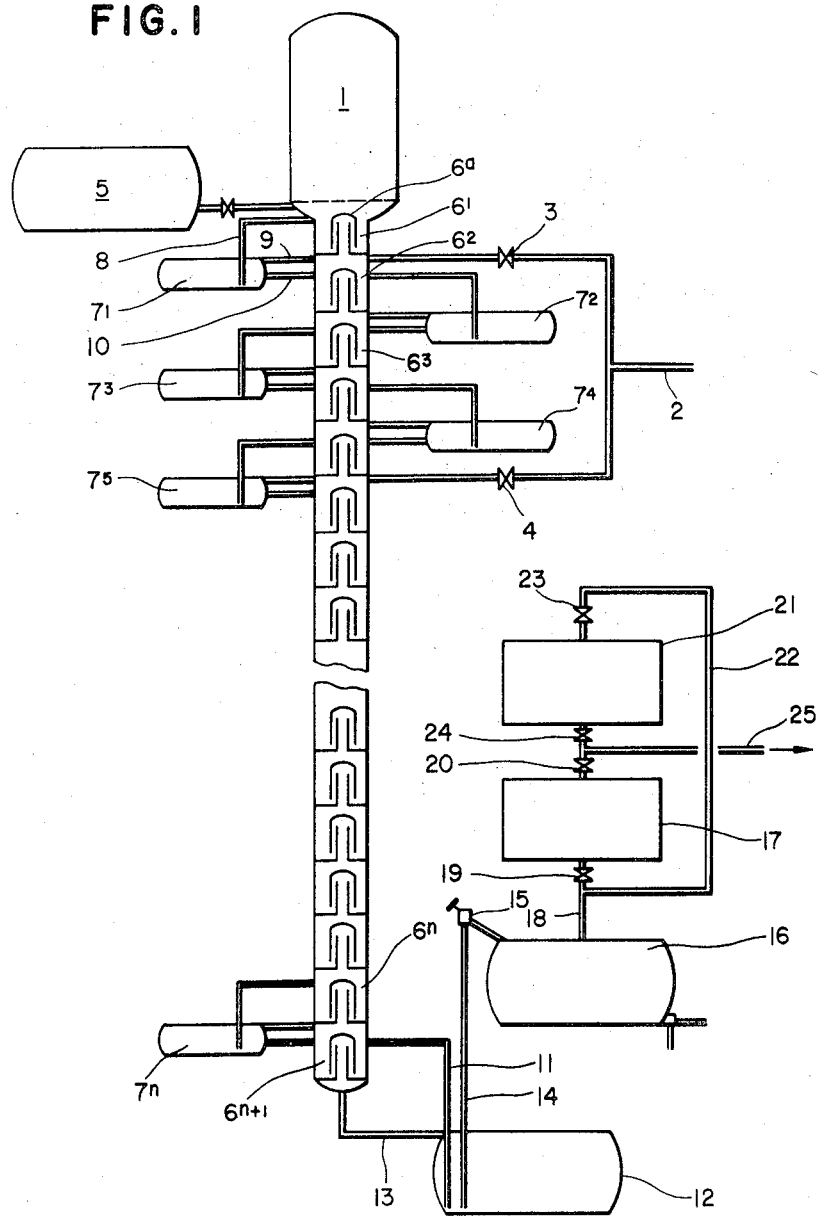
FIG. 1 is a schematic view of a basic structure of an apparatus for separating and concentrating hafnium tetrachloride from zirconium tetrachloride by utilizing the present method.

In FIG. 1, reference numeral 1 is a storage vessel for sodium chloride, and the storage vessel 1 serves, at the same time, as a reaction chamber for forming a double salt by allowing raw material zirconium tetrachloride vapour containing hafnium tetrachloride, which will be supplied from a pipe 2 through valve 3 or 4, to react with sodium chloride. Numeral 5 is a storage vessel for storing zirconium tetrachloride having a high hafnium tetrachloride concentration. Numeral $6^1$ is a reaction compartment for forming a higher double salt by allowing the double salt, which has been formed in the reaction chamber 1, to react with rising zirconium tetrachloride vapour having a high hafnium tetrachloride concentration. Numeral $7^1$ is a tank provided with a heating means to decompose the double salt formed in the reaction compartment $6^1$. Numerals $6^2$ to $6^{n+1}$ are reaction compartments for forming double salts having lower hafnium tetrachloride contents, in other words, higher zirconium tetrachloride contents successively in this order. Numerals $7^2$ to $7^n$ are tanks, each provided with the heating means to decompose the double salts introduced therein from the reaction compartments $6^2$ to $6^n$ by overflow respectively. Each tank is further provided with a pipe 8 for receiving said overflowed double salt, a pipe 9 for introducing the vapour resulting from the decomposition to the corresponding reaction compartment and a pipe 10 for introducing the decomposed double salt to the reaction compartment at the next stage. Each of the reaction compartments $6^1$ to $6^{n+1}$ is provided with a dispersion means $6^a$ for effecting the closest contact of the vapour with the double salt. The number of stages for the reaction compartments is 10 to several tens, but depends upon the hafnium tetrachloride concentration of the raw material zirconium tetrachloride, the double salt formation and decomposition conditions, and the hafnium concentration of the zirconium tetrachloride discharged from the top of the reaction column.

The double salt to be overflowed from the lowest reaction compartment $6^{n+1}$ is introduced into an evaporator 12 provided with a heating means through a pipe 11. The hafnium tetrachloride content of the vapour which is generated in the evaporator 12 and is to be introduced into the bottom of the lowest reaction compartment $6^{n+1}$ through a pipe 13, is very small. The double salt containing substantially no hafnium tetrachloride in the evaporator 12 is led to a double salt decomposition vessel 16 through a pipe 14 provided with a pump-valve means 15. The vapour generated by complete thermal decomposition of the double salt in the decomposition vessel 16, that is, the zirconium tetrachloride vapour containing substantially no hafnium tetrachloride, passes through a condenser 17 through a pipe provided with valves 19 and 20 or passes a condenser 21 through the pipe 18 and a by-pass pipe 22 provided with valves 23 and 24, and reaches a supply pipe 25 to the next reduction apparatus (not shown). The residue in the decomposition vessel 16, from which zirconium tetrachloride has been evaporated off and which contains only sodium chloride, and sodium chloride condensed in the condensers 17 and 21 are returned to the reaction chamber or storage vessel 1, after having been purified, if necessary.

When the raw material zirconium tetrachloride vapour is supplied into the apparatus through the valve 3, the entire apparatus serves to effect complete separation, and consequently, the maximum separating action can be carried out, and the amount of zirconium tetrachloride to be discharged becomes maximum, whereas the hafnium tetrachloride concentration is lowered.

When the raw material zirconium tetrachloride vapour is supplied to the apparatus through the valve 4, the portion of the apparatus above the level of the supply point serves to concentrate hafnium tetrachloride, and consequently the amount of zirconium tetrachloride to be discharged becomes less, while the hafnium tetrachloride concentration becomes higher.

Figure 2:
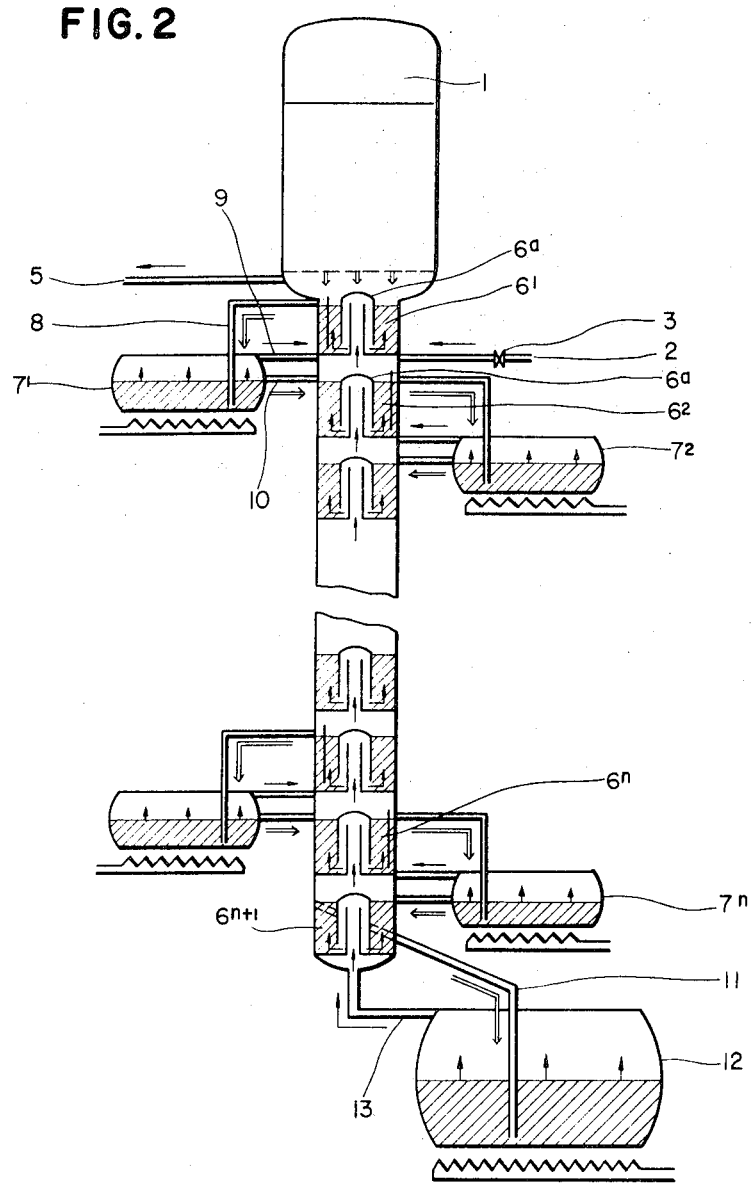
FIG. 2 is an enlarged schematic view showing the essential portion of the apparatus as shown in FIG. 1.

In FIG. 2, arrows marked "→" shows a vapour flow and arrows marked "⇒" shows a double salt flow.

When the compartments for forming the double salt, 1, $6^1$, $6^2$, ... $6^{n+1}$ are maintained at 400°–450° C., for example, at about 420° C.; the compartments for thermal decomposition of the double salt, $7^1$, $7^2$, ... $7^n$ are maintained at 450°–500° C., for example, about 470° C.; the evaporator 12 is maintained at 650°–700° C., for example, about 670° C.; the reaction chamber 1 is maintained under a pressure of 6–8 atmospheres, for example, about 7 atmospheres; and the evaporator 12 is maintained under a pressure of about 8 atmospheres, the compositions of the formed double salts will have the following formulas:

$3ZrCl_4 \cdot NaCl$ for the compartments for forming the double salt, $6^1$, $6^2$, ... $6^{n+1}$.

$2ZrCl_4 \cdot NaCl$ for the compartments for thermal decomposition of the double salt, $7^1, 7^2, \ldots 7^n$.

$ZrCl_4 \cdot NaCl$ for the evaporator 12.

When one mole of the raw material zirconium tetrachloride vapour is supplied from the pipe 2 in the apparatus of FIG. 2; the separation factor of hafnium in the compartments for forming the double salt is presumed to be 1.8 (the separation factor of hafnium in the reaction chamber 1 is presumed to be 2); and the separation factor of hafnium in the compartments for thermal decomposition is presumed to be 1.4 (the separation factor of hafnium in the evaporator 12 is presumed to be 1.1), the flow rates of the vapour and double salt at each stage and the hafnium tetrachloride concentrations of said vapour and double salt are given below (the hafnium concentration of the raw material zirconium tetrachloride being 2.5% by weight; the operating pressure being 7 atmospheres; and the temperatures being 420° C. for the double salt formation steps and 500° C. for the thermal decomposition step, and 700° C. for the evaporator):

The amount of vapor rising through $6^1$ is 1.5 mole, and its hafnium concentration is 2.84% by weight. The amount of the vapour supplied to $6^1$ is 2.5 mole and its average hafnium concentration is 2.7% by weight. If the amount of hafnium to be discharged to 5 is assumed to be 0.5 mole, the hafnium concentration of the vapour to 5 is 4.5% by weight, because the separation factor of hafnium in 1 is 2.0, and the hafnium concentration of the double salt ($3ZrCl_4 \cdot NaCl$) to be supplied to the thermal decomposition tank $7^1$ through 8 is 2.25% by weight. In $7^1$, the double salt is decomposed to one mole of zirconium tetrachloride vapour and one mole of the double salt containing zirconium tetrachloride

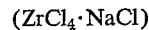

($ZrCl_4 \cdot NaCl$)

As the separation factor at that time is 1.4, the hafnium concentrations of the vapour and the double salt are 2.63% and 1.87% by weight respectively. Then, the double salt is supplied to the compartment for forming the double salt, $6^2$, through 10, and reacts with 1.5 mole of zirconium tetrachloride having a hafnium concentration of 2.36% by weight, which rises from the lower compartment, to form a double salt ($3ZrCl_4 \cdot NaCl$). As the separation factor of hafnium at the formation of said double salt is 1.8, the hafnium concentration of the double salt is 1.87% by weight, and the hafnium concentration of 0.5 mole of zirconium tetrachloride vapour, which is an excess at the formation of said double salt, is 3.24% by weight. When the reaction compartments amount to 30 stages, the hafnium concentration of the double salt, for example, at the 31st stage will be one-three hundredth of the initial concentration, that is, about 0.008% by weight in this manner, and the hafnium concentration of the double salt at the 33rd stage will be about 0.006% by weight. In the evaporator 12 at the lowest level, the double salt ($3ZrCl_4 \cdot NaCl$) supplied from $6^{n+1}$, that is, the reaction compartment at the 33rd stage, is decomposed to a lower double salt

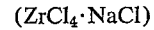

($ZrCl_4 \cdot NaCl$)

generating 1.5 mole of the vapour. As the hafnium concentration of the double salt in the reaction compartment, $6^{n+1}$, at the 33rd stage is 0.006% by weight and the separation factor of hafnium in the evaporator 12 is 1.1, the hafnium concentrations of the decomposed double salt and vapour are 0.0055% and 0.0061% by weight, respectively. It is not always necessary that the double salts formed in $6^1, 6^2$, etc. have the composition of $3ZnCl_4 \cdot NaCl$. If the formed double salt has not such a composition, the separation efficiency, that is, the efficiency per stage changes. When the number of stages is sufficient and the hafnium concentration may be reduced to the desired degree even if the efficiency per stage is low, the decomposition ratio can be lowered. As lowering the decomposition percentage or ratio, the larger amount of desired zirconium tetrachloride having a low hafnium content can be recovered. Thus, the separation becomes economical. However, in order to lower the decomposition ratio, it is necessary to increase the number of reaction compartment stages necessary for attaining the desired object, and thus the cost for manufacturing the apparatus will be higher.

When the number of the reaction compartment stages is increased, the raw material zirconium tetrachloride vapour to be supplied through the pipe 3 can be introduced into the apparatus through the valve 4 (FIG. 1). In that case, the hafnium concentration of the zirconium tetrachloride discharged to 5 will be higher. For example, when the amount of the raw material zirconium tetrachloride vapor is 0.7 mole; the amount of the vapor discharged to 5 is 0.2 mole; and the number of concentration stages is 5, as shown in FIG. 1, the hafnium concentration of the discharged vapour becomes about 10% by weight, which is more than 2 times as much as the value (4.5%) in the foregoing example where the raw material zirconium tetrachloride vapour is supplied to the apparatus through the valve 3.

As explained with reference to FIG. 1, the double salt decomposed in the evaporator 12 is lead to 16, where it is decomposed to pure sodium chloride, and 0.5 mole of the zirconium tetrachloride vapour is fed to the next reduction step through the condenser 17 or 21, and reduced therein the pure metallic zirconium containing 0.005–0.006% by weight of hafnium.

Figure 3:
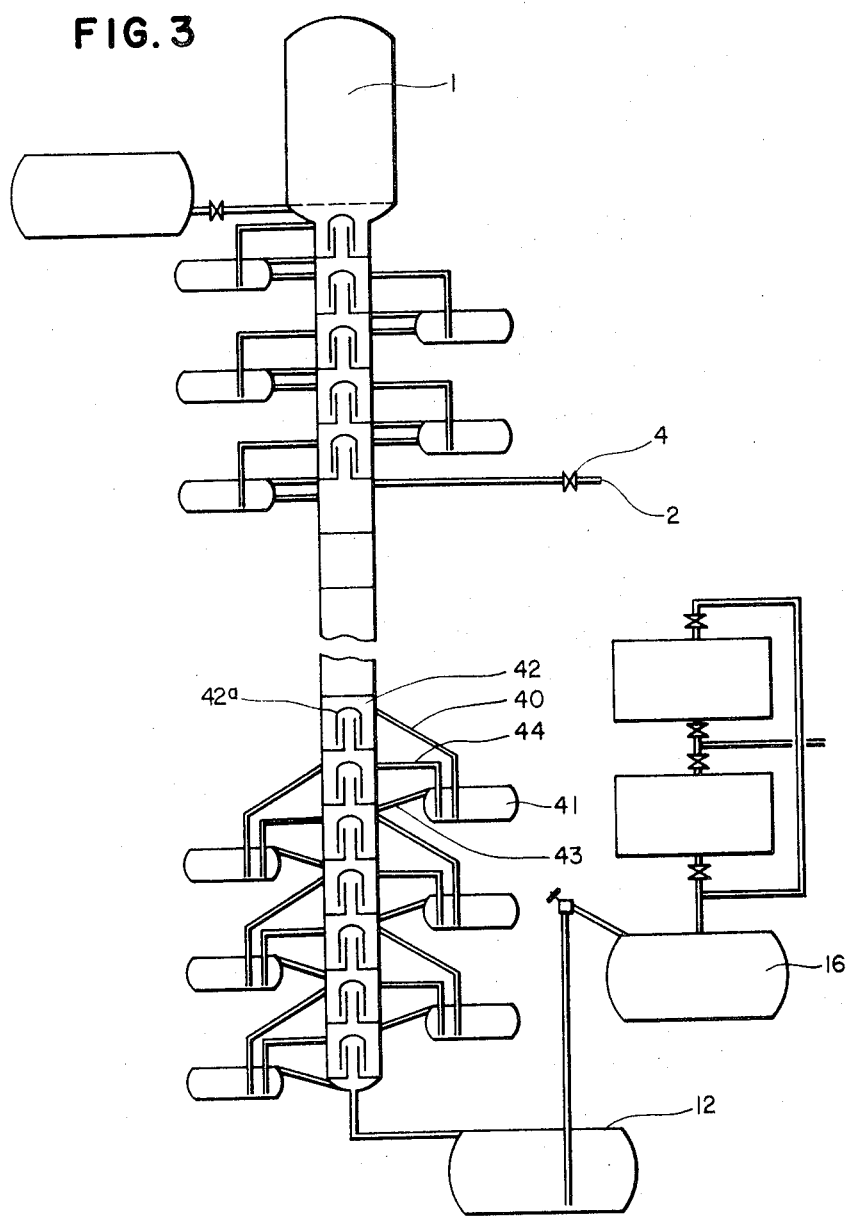
FIG. 3 is a schematic view of another basic structure of an apparatus for utilizing the present method.

FIG. 3 is a schematic view of another basic structure of an apparatus for carrying out the present method. The apparatus is designed so that it may be used when the separation factor of hafnium at the thermal decomposition of the double salt is low and the separation factor of hafnium at the formation of the double salt is high. The hafnium concentrating portion, that is, the portion above the level of the pipe 2 for supplying the raw material zirconium tetrachloride vapour, and the structure of the apparatus at the down-stream side of the final double salt complete decomposition vessel 16 are quite similar to those as explained with reference to FIGS. 1 and 2, and thus an explanation of these portions will not be repeated. A pipe 40 corresponds to the pipe 8 in the apparatuses of FIGS. 1 and 2 and serves to supply the double salt overflowed from a double salt formation compartment 42 provided with a dispersing means 42a to a thermal decomposition tank 41 at the lower stage. A pipe 43 serves to supply the vapour generated by decomposition of the double salt in the thermal decomposition tank 41 further to a double salt formation compartment at the lower stage, and corresponds to the pipe 9 in the apparatuses of FIGS. 1 and 2. In the apparatuses of FIGS. 1 and 2, the pipe 9 is communicated with the double salt formation compartment at the same stage, but in the apparatus of FIG. 3, the pipe 43 is communicated to the double salt formation compartment at the lower stage. A pipe 44 corresponds to the pipe 10 in the apparatuses of FIGS. 1 and 2, and serves to supply the lower double salt thermally decomposed in the decomposition tank 41 to the double salt formation compartment at the next stage. In the apparatus of FIG. 3, the decomposed double salt is pumped up by a suitable pumping means (not shown) without any overflow from the decomposition tank. When the double salt formation compartments 42, etc. are maintained at 400°–450° C., for example, 420° C. in the apparatus of FIG. 3; the thermal decomposition tanks 41, etc. at 500°–550° C.; the evaporator 12 at 700°–750° C., for example, 730° C.; the reaction compartment is maintained under a pressure of 6.5–7.5 atmospheres, for example 7 atmospheres; and the evaporator under a pressure of about 8 atmospheres, the compositions of the double salts will have the following formulae:

$2ZrCl_4 \cdot NaCl$ for the double salt formation compartments, 42, etc.

$4ZrCl_4 \cdot 5NaCl$ for the thermal decomposition compartments, 41, etc.

$ZrCl_4 \cdot 3NaCl$ for the evaporator 12.

Figure 4:
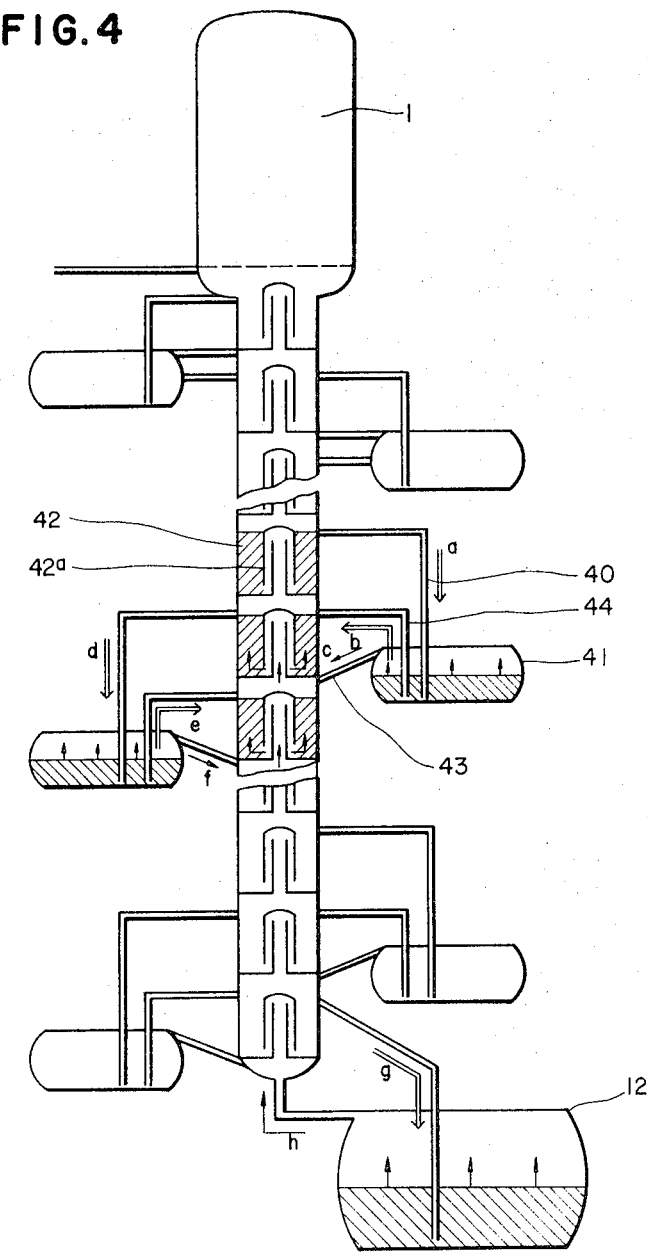
FIG. 4 is an enlarged schematic view showing the essential portion of the apparatus as shown in FIG. 3.

FIG. 4 is an enlarged schematic view showing a partial of the device of FIG. 3.

In the apparatus of FIG. 4, the flow rates of the zirconium tetrachloride vapour at each compartment or stage and the flow rate of zirconium tetrachloride in the double salt are shown below (arrows marked "→" shows a vapor flow and arrows marked "⇒" a flow of zirconium tetrachloride in the double salt):

| Compartment or stage | Flow rate, moles | Compartment or stage | Flow rate, moles |
|---|---|---|---|
| a | 2.0 | e | 0.8 |
| b | 0.8 | f | 1.2 |
| c | 1.2 | g | 2.0 |
| d | 2.0 | h | 1.67 |

When the separation factor of hafnium in the double salt formation compartment is presumed to be 2.0; the separation factor in the thermal decomposition tank 1.2; the hafnium concentration of the double salt to be supplied from the double salt formation compartment 42 to the decomposition tank 41 is presumed to be 1.0% by weight; and the hafnium concentration of the vapour rising from the lower stage to be supplied to the dispersing means of the double salt formation compartment at the next stage 1.0% by weight, the hafnium concentration of 1.67 mole of the rising vapour will be 3.30% by weight and the hafnium concentration of the double salt supplied to the thermal decomposition tank at the lower stage will be 0.74% by weight. Accordingly, when the number of reaction stages of at least 22 is employed, the hafnium concentration of zirconium tetrachloride in the finally obtained double salt can be reduced to about one-four hundredth as low as the hafnium concentration of the raw material zirconium tetrachloride.

Figure 5:
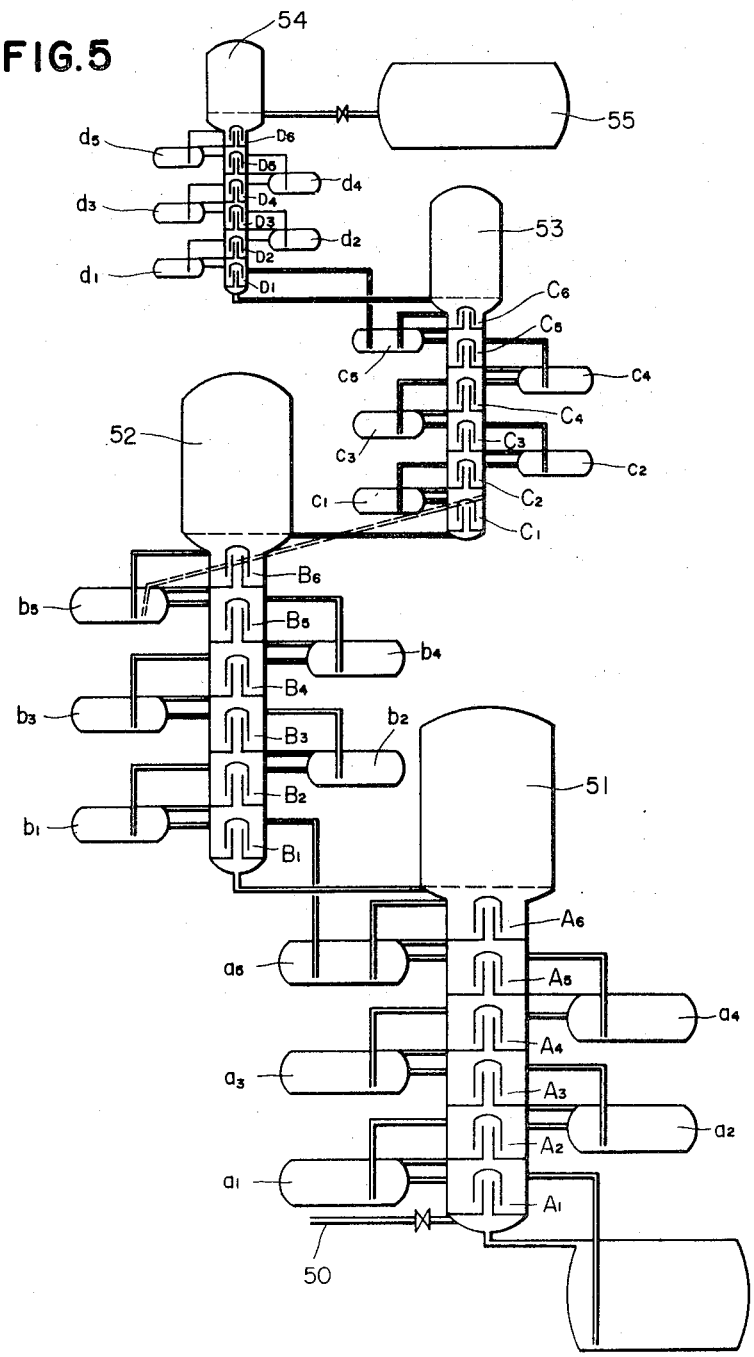
FIG. 5 is a schematic view of an apparatus for concentrating hafnium.

FIG. 5 is a schematic view showing an apparatus for concentrating hafnium tetrachloride contained in the raw material zirconium tetrachloride by utilizing the present method. Reference numeral 50 is a pipe for supplying the raw material zirconium tetrachloride, and 51, 52, 53 and 54 are the storage vessels for sodium chloride, which serve as double salt reaction chambers at the same time, similar to the storage vessel 1 in FIGS. 1 to 4. $A_6$ to $A_1$ are the first stage double salt formation compartments; $a_5$ to $a_1$ the first stage thermal decomposition tanks; $B_6$ to $B_1$ the second stage double salt formation compartments; $b_5$ to $b_1$ the second stage thermal decomposition tanks; $C_6$ to $C_1$ the third stage double salt formation compartments; $c_5$ to $c_1$ the third stage thermal decomposition tanks; $D_6$ to $D_1$ the fourth stage double salt formation compartments; and $d_5$ to $d_1$ the fourth stage thermal decomposition tanks. By using the same temperature and pressure conditions as in the embodiment of FIGS. 1 and 2, in the apparatus of FIG. 5, a hafnium tetrachloride vapour having a hafnium chloride concentration of at least 98.5% by weight can be discharged into the storage vessel 55. The hafnium tetrachloride vapour stored in said storage vessel 55 can be sent to a reduction step through a suitable pipe (not shown) and reduced to metallic hafnium therein.

The composition of the double salt formed in formation compartment therefor should not be restricted to a specific one, for instance such compositions as $2ZrCl_4 \cdot NaCl$, $3ZrCl_4 \cdot NaCl$, $4ZrCl_4 \cdot NaCl$ may be used as well as other composition double salts. The composition of the decomposed double salts may be of $ZrCl_4 \cdot NaCl$, $2ZrCl_4 \cdot NaCl$, $3ZrCl_4 \cdot NaCl$ or any intermediate level of said composition. The compositions of the formed and decomposed double salts shall be determined depending upon temperature and pressure condition as used.

In the foregoing, the present invention has been explained, referring only to the case where sodium chloride is used as the chloride, but the present invention can be likewise applied to the cases where other alkali chlorides are used alone or in a mixture of at least two of them. Further, the present invention can be applied likewise to the case where tin dichloride is used as the chloride, but in that case the apparatus as shown in FIG. 3 can be advantageously used and zirconium tetrachloride having a low hafnium content can be obtained satisfactorily in an apparatus having 20 or less stages, because the formed double salt can be completely decomposed.

I claim:

1. A method for preparing zirconium tetrachloride having a low hafnium content and high purity hafnium tetrachloride which comprises forming a double salt between an excess amount of raw material zirconium tetrachloride vapor containing a relatively large amount of hafnium tetrachloride therein and a salt capable of forming the double salt with zirconium tetrachloride, thermally decomposing the resulting double salt at a temperature ranging from 400 to 800° C. under a pressure of one or more atmospheres to vaporize hafnium tetrachloride to a greater extent than the zirconium tetrachloride, contacting and reacting the thus generated vapor with another double salt as previously decomposed, at a temperature ranging from 350 to 600° C. under a pressure of one or more atmospheres to form a double salt again, and repeating the double salt forming and decomposing operations to transfer hafnium tetrachloride from the respective double salt to the vapor phase so as to concentrate zirconium tetrachloride in the respective double salt.

2. The method as claimed in claim 2, wherein said formation of the double salt is conducted under a pressure not exceeding 20 atmospheres and said decomposition of the double salt is conducted under a pressure not exceeding 10 atmospheres.

3. The method as claimed in claim 2, wherein both the formation and decomposition of the double salt are conducted under pressure of 1 to 10 atmospheres, respectively.

4. The method as claimed in claim 1, wherein the formation of the double salt is conducted at a temperature ranging from 350 to 500° C. and the decomposition of the double salt is conducted at a temperature ranging from 450 to 800° C.

5. A method for preparing zirconium tetrachloride having a low hafnium content comprising charging a molten salt capable of forming a double salt with zirconium tetrachloride to a top part of a column, charging a raw material zirconium tetrachloride vapor containing a relatively large amount of hafnium tetrachloride into the column from a portion near the top thereof, contacting and reacting an excess amount of said raw material zirconium tetrachloride vapor with said molten salt at a temperature ranging from 350 to 600° C. under a pressure of one or more atmospheres to form a double salt therebetween, thermally decomposing the resulting double salt at a temperature ranging from 400 to 800° C. under a pressure of one or more atmospheres to discharge zirconium tetrachloride vapor rich in hafnium tetrachloride from the upper part of the column, contacting and reacting again the thus decomposed double salt with a rising zirconium tetrachloride vapor rich in hafnium tetrachloride and generated from a double salt lying in a lower part of the column to form a double salt having a composition different from other double salts, transferring the decomposed double salt rich in zirconium tetrachloride to a lower portion of the column, repeating said formation and decomposition of the respective double salt, and thermally treating the double salt descended to the bottom of the column to vaporize and separate zirconium tetrachloride having a desired purity from the double salt.

6. A method for preparing hafnium tetrachloride having a high purity which comprises charging a molten salt capable of forming a double salt with zirconium tetrachloride to a top part of a column, charging a raw material zirconium tetrachloride vapor containing a relatively large amount of hafnium tetrachloride into the column from a portion near the bottom thereof, contacting and reacting an excess amount of said raw material zirconium tetrachloride vapor with said molten salt at a temperature ranging from 350 to 600° C. under a pressure of one or more atmospheres to form a double salt therebetween, thermally decomposing the resulting double salt at a temperature ranging from 400 to 800° C. under a pressure of one or more atmospheres to form zirconium tetrachloride vapor rich in hafnium tetrachloride, forming a double salt again at an upper portion of the column between the thus vaporized zirconium tetrachloride rich in hafnium tetrachloride and a salt regenerated from a double salt by thermal decomposition thereof, restricting an amount of rising vapor towards the upper part of the column, and repeating the formation and decomposition of the respective double salt to gradually concentrate hafnium tetrachloride in vapor phase.

References Cited
UNITED STATES PATENTS

| | | | |
|---|---|---|---|
| 2,744,060 | 5/1956 | Eaton | 23—24 Z |
| 3,114,611 | 12/1963 | Ross | 23—87 RX |
| 2,816,814 | 12/1957 | Plucknett | 23—17 |

FOREIGN PATENTS

| | | | |
|---|---|---|---|
| 1,118,768 | 12/1961 | Germany | 23—24 Z |

HERBERT T. CARTER, Primary Examiner

U.S. Cl. X.R.

23—17, 21, 87 R